Patented Feb. 28, 1950

2,499,058

UNITED STATES PATENT OFFICE 2,499,058

8-HALOXANTHINE SALTS OF DIARYLALKYL DIALKYLAMINOALKYL ETHERS

John W. Cusic, Skokie, Ill., assignor to G. D. Searle & Co., Chicago, Ill., a corporation of Illinois No Drawing. Application March 18, 1949, Serial No. 82,284

17 Claims. (Cl. 260—253)

This invention relates to haloxanthine compounds of diarylalkyl ethers of aminoalkanols and to the production thereof. More particularly this invention relates to haloxanthine salts of organic bases having the following general structural formula

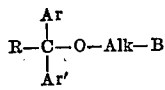

wherein Ar and Ar' are aryl radicals, R is a lower alkyl radical or a hydrogen atom, Alk is a lower alkylene radical, and B is an aliphatic-type organic amino radical.

This application is a continuation-in-part of my copending application Serial No. 71,763, filed January 19, 1949, which is a continuation-in-part of my copending application Serial No. 745,630, filed May 2, 1947, now abandoned.

In the foregoing structural formula Ar and Ar' represent lower aryl radicals which may be the same or different. Among such radicals are phenyl, tolyl, chlorophenyl, bromophenyl, iodophenyl, methoxyphenyl, ethoxyphenyl, xylyl, and similar aryl radicals of the benzene series. R represents hydrogen or a lower alkyl radical such as methyl or ethyl. Alk represents lower alkylene radicals such as ethylene, propylene, or the butylene radicals, and polymethylene radicals such as trimethylene and tetramethylene. The amino radical B represents aliphatic-type amino radicals, such as mono- and di(lower alkyl) amino radicals, wherein the lower alkyl radicals may be the same or different and the corresponding mono- and di(hydroxyalkyl) amino radicals containing one or two hydroxyl groups. As used herein, "lower alkyl" means a primary or secondary alkyl radical containing 1 to 5 carbon atoms. B also may represent cyclic amino radicals and heterocyclic amino radicals which are aliphatic in character. It includes amino groups such as cyclohexylamino, cyclopentylamino, morpholino, piperidino, pyrrolidino, thiamorpholino, and alkyl derivatives of such amino radicals. B therefore represents a non-aromatic amino radical derived from an organic amine having dissociation constant in the range of $1\times10^{-3}$ to $1\times10^{-5}$.

It is widely recognized that antihistaminic agents such as diarylalkyl(dialkylaminoalkyl ethers elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by diarylalkyl dialkylaminoalkyl ethers are often severe enough to warrant reduced dosage or discontinuance of the medication.

It is the object of this invention to produce therapeutic compositions of matter which are relatively free from untoward reactions. A further object is to produce compositions of diarylalkyl dialkylaminoalkyl ethers and haloxanthines of reduced toxicity. Another object is to produce compositions having enhanced therapeutic efficacy. Other objects will be apparent to those skilled in the art, in view of the disclosure given herein.

I have discovered that salts of diarylalkyl dialkylaminoalkyl ethers with haloxanthines produce little effect on the central nervous system and are therapeutically more useful than any of the individual components alone. The salts of diarylalkyl dialkylaminoalkyl ethers and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symtoms commonly elicited by the usual antihistaminic drugs. For instance, my compounds can be used to prevent or alleviate nausea, motion sickness, dizziness and other distressing reactions.

In particular it has been found on extensive clinical trial that β-dimethylaminoethyl benzohydrol ether 8-chlorotheophyllinate, which is shown in Example 10, is unusually effective in the prevention and treatment of motion sickness, particularly seasickness. This substance, which is known by the generic name dimenhydrinate and which is marketed under the trade-mark "Dramamine," is more effective than other remedies which have been used heretofore.

Among the halogenated xanthines to which this invention pertains are the chloro, bromo, and iodo derivatives of theophylline and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-chloroxanthine
1,3-diethyl-8-bromoxanthine
1,3-diethyl-8-chloroxanthine
8-iodotheophylline
8-iodo-1,3-dimethylxanthine Compositions of diarylalkyl dialkylaminoalkyl ethers and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the basic ether are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid basic ether and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the basic ether. During the heating, ammonia is evolved and the haloxanthine salt of the basic ether is formed. On chilling this salt precipitates.

The following examples illustrate in more detail my invention, but in no way are to be construed as limiting it in spirit or in scope.

Example 1

8 grams of β-dimethylaminoethyl benzohydryl ether and 7 g. of 8-chlorotheophylline are thoroughly mixed. The mixture becomes warm, indicating chemical reaction. It is dissolved in about 50 cubic centimeters of hot alcohol and allowed to cool slowly. Crystals of the β-dimethylaminoethyl benzohydryl ether salt of 8-chlorotheophylline separate; melting point 103–104° C.

Using 8-bromotheophylline in place of 8-chlorotheophylline, there is obtained the dimethylaminoethyl benzohydryl ether salt of 8-bromotheophylline; M. P. 112–113° C.

Example 2

A solution of 98.6 g. of β-chloroethyl benzohydryl ether and 99 g. of cyclohexylamine in 200 cc. of butanone containing 5 g. of potassium iodide is refluxed for 3–4 days. The mixture is added to about 500 cc. of water, and the resulting mixture is made alkaline and extracted with ether. The ether extract is dried and evaporated. The residue of β-cyclohexylaminoethyl benzohydryl ether distils at 170–175° C. at 1:5 mm. pressure.

6 g. of the foregoing ether and 4 g. of 8-chlorotheophylline are dissolved in the minimum amount of hot butanone (100 cc. of butanone diluted with 4 cc. of water). The hot solution is filtered and allowed to cool slowly. There are deposited crystals of the 8-chlorotheophylline salt of β-cyclohexylaminoethyl benzohydryl ether. These are removed, washed with cold butanone and dried.

Example 3

82 g. of β-diethylaminoethyl benzohydryl ether and 70 g. of 8-chlorotheophylline are dissolved in 350 cc. of hot methyl ethyl ketone. The resulting solution is filtered and evaporated on the steam bath until crystallization occurs. The crystalline β-diethylaminoethyl benzohydryl ether salt of 8-chlorotheophylline is removed by chilling and filtration, and is washed with cold methyl ethyl ketone and dried.

Example 5

30 g. of γ-diethylaminopropyl benzohydryl ether and 24 g. of 8-bromotheophylline are thoroughly mixed. The mixture is then dissolved in about 200 cc. of hot isopropanol, filtered and allowed to cool. A precipitate of the γ-diethylaminopropyl benzohydryl ether salt of 8-bromotheophylline separates. This is filtered off, washed with cold isopropanol and dried. This salt on analysis showed 14.5% bromine; calculated 14.34%.

Example 6

5 g. of β-dimethylaminoethyl benzohydryl ether and 4 g. of 8-iodotheophylline are mixed and dissolved in the minimum quantity of boiling methyl ethyl ketone. The warm solution is filtered and then chilled. There is formed a precipitate of the β-dimethylaminoethyl benzohydryl ether salt of 8-iodotheophylline. This product is removed and dried. It apparently is a 1:1 addition salt but has no sharp melting point.

Example 7

7 g. of p,p'-diiodobenzohydryl β-dimethylaminoethyl ether and 2.1 g. of 8-chlorotheophylline are mixed and dissolved in the minimum of hot methyl ethyl ketone. The solution is boiled for a few minutes, then filtered while hot and chilled. A precipitate of the 8-chlorotheophylline salt of p,p'-diiodobenzohydryl β-dimethylaminoethyl ether forms. A sample of this salt on analysis showed 31.6% chlorotheophylline (calculated, 29.7%).

Example 8

An intimate mixture of 18.7 g. of 8-chloroxanthine and 30 g. of β-dimethylaminoethyl benzohydryl ether is taken up in hot methyl ethyl ketone. The warm solution is filtered and chilled. A crystalline precipitate of the 8-chloroxanthine salt of β-dimethylaminoethyl benzohydryl ether forms.

Example 9

A mixture of 21.5 g. of 8-chlorotheophylline, 25.5 g. of β-dimethylaminoethyl benzohydryl ether, and 5 parts of hot water is stirred occasionally while heated at 95–100° C. The mixture gradually liquifies to a thick oil due to the water and other impurities. The stirring is continued for about an hour, and then the reaction mixture is allowed to cool. The solid cake which forms is broken up, powdered and dried in vacuum at 40–50° C. Analysis of the resulting 8-chlorotheophylline salt of β-dimethylaminoethyl benzohydryl ether showed 44.6% chlorotheophylline (calculated 45.67%).

Example 10

21 g. of benzohydryl β-(N-β-hydroxyethyl-methylamino)ethyl ether and 20 g. of 8-chlorotheophylline are dissolved in the minimum amount of warm aqueous methyl ethyl ketone and filtered. The filtrate is chilled and crystals of the 8-chlorotheophylline salt of benzohydryl β-(N-β-hydroxyethyl-methylamino)ethyl ether separate. These are removed and dried, and melt at 225–230° C.

Example 11

58.8 g. of 8-chlorotheophylline and 70 g. of β-dimethylaminoethyl benzohydryl ether are dissolved in 150 cc. of hot methanol. Then 5 g. of activated charcoal are added and the mixture is boiled for an hour. It is filtered hot and the filtrate cooled. The crystalline precipitate of β-dimethylaminoethyl benzohydryl ether 8-chlorotheophyllinate is collected on a filter, washed with ether and dried. It melts at 96–99° C. It is dissolved in boiling ethyl acetate, filtered hot to remove any insoluble material, and then chilled. The salt so obtained melts at 102.5–104° C. after filtration, washing with ether and drying.

Example 12

A hot solution of 23.2 g. of ammonium 8-chlorotheophyllinate and 25.5 g. of β-dimethylaminoethyl benzohydryl ether in 95 cc. of isopropanol and 10 cc. of water is refluxed for 4 hours. On chilling the salt precipitates. This is removed by filtration, washed with ether and dried. The 8-chlorotheophylline salt of β-dimethylaminoethyl benzohydryl ether so prepared melts at 102–104° C. After recrystallization from ethyl acetate it melts at 104–105° C.

I claim:

1. A salt of an organic base having the formula $$R-\underset{\underset{Ar'}{|}}{\overset{\overset{Ar}{|}}{C}}-O-Alk-N\overset{R'}{\underset{R''}{<}}$$

wherein R is a member of the group consisting of hydrogen and lower alkyl radicals, Ar and Ar' are monocyclic aryl radicals, Alk is a lower alkylene radical, and R' and R'' are lower alkyl radicals, with an 8-haloxanthine which contains a hydrogen atom in position 7.

2. An 8-haloxanthine salt of a di-monocyclic-(lower alkyl)amino-lower-alkyl di-arylmethyl ether, wherein the 8-haloxanthine contains a hydrogen atom in position 7.

3. An 8-haloxanthine salt of a di(lower alkyl)-amino-lower-alkyl benzohydryl ether, wherein the 8-haloxanthine contains a hydrogen atom in position 7.

4. An 8-haloxanthine salt of a di(lower alkyl)-aminoethyl benzohydryl ether, wherein the 8-haloxanthine contains a hydrogen atom in position 7.

5. An 8-haloxanthine salt of β-dimethylaminoethyl benzohydryl ether, wherein the 8-haloxanthine contains a hydrogen atom in position 7.

6. An 8-halotheophylline salt of β-dimethylaminoethyl benzohydryl ether.

7. The 8-chlorotheophylline salt of β-dimethylaminoethyl benzohydryl ether.

8. The 8-bromotheophylline salt of β-dimethylaminoethyl benzohydryl ether.

9. The 8-iodotheophylline salt of β-dimethylaminoethyl benzohydryl ether.

10. An 8-haloxanthine salt of a di-(lower alkyl)-aminopropyl benzohydryl ether wherein the 8-haloxanthine contains a hydrogen atom in position 7.

11. An 8-haloxanthine salt of γ-diethylaminopropyl benzohydryl ether wherein the 8-haloxanthine contains a hydrogen atom in position 7.

12. The 8-bromotheophylline salt of γ-diethylaminopropyl benzohydryl ether.

13. The process of producing a salt of an organic base of the formula $$R-\underset{\underset{Ar'}{|}}{\overset{\overset{Ar}{|}}{C}}-O-Alk-N\overset{R'}{\underset{R''}{<}}$$

wherein R is a member of the group consisting of hydrogen and lower alkyl radicals, Ar and Ar' are monocyclic aryl radicals, Alk is a lower alkylene radical and R' and R'' are lower alkyl radicals, and an 8-haloxanthine which contains a hydrogen atom in position 7, which comprises mixing a member of the group consisting of an 8-haloxanthine which contains a hydrogen atom in position 7 and the ammonium salt thereof, with the organic base of the foregoing formula in an inert water-soluble organic solvent at an elevated temperature, precipitating the salt by chilling, and separating said salt.

14. The process of claim 13 wherein the solvent is methyl ethyl ketone.

15. The process of claim 13 wherein the solvent is isopropyl alcohol.

16. The process of producing the 8-chlorotheophylline salt of β-dimethylaminoethyl benzohydryl ether which comprises heating a mixture of 8-chlorotheophylline and β-dimethylaminoethyl benzohydryl ether in an inert water-soluble organic solvent until dissolved, chilling the solution and separating the desired salt.

17. The process of claim 16 wherein the solvent is isopropanol.

JOHN W. CUSIC.

No references cited.

Certificate of Correction

Patent No. 2,499,058 February 28, 1950

JOHN W. CUSIC

It is hereby certified that errors appear in the printed specification of the above numbered patent requiring correction as follows:

Column 1, line 50, before "dialkylaminoalkyl" strike out the opening parenthesis; column 2, line 34, for "symtoms" read *symptoms*; column 3, line 70, for "1:5 mm." read *1.5 mm.*; column 5, line 51, strike out "monocyclic-"; line 52, for "di-arylmethyl" read *di-monocyclic arylmethyl*;

and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*